US006533170B1

(12) United States Patent
Kit

(10) Patent No.: US 6,533,170 B1

(45) Date of Patent: Mar. 18, 2003

(54) USER INTERFACE FOR A SELF-SERVICE TERMINAL

(75) Inventor: Andrew Kit, Dundee (GB)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/433,140

(22) Filed: Nov. 3, 1999

(30) Foreign Application Priority Data

Dec. 3, 1998 (GB) .......................................... 9826427

(51) Int. Cl.[7] .......................................... G06F 17/60

(52) U.S. Cl. ...................... 235/379; 235/375; 235/380

(58) Field of Search .............................. 235/379, 380, 235/375; 362/26, 27, 29, 31, 32

(56) References Cited

U.S. PATENT DOCUMENTS

| | | | | |
|---|---|---|---|---|
| 4,115,930 A | * | 9/1978 | Beck | 434/131 |
| 4,187,498 A | * | 2/1980 | Creekmore | 235/379 |
| 4,345,315 A | * | 8/1982 | Cadotte et al. | 705/10 |
| 5,202,549 A | * | 4/1993 | Decker et al. | 235/375 |
| 5,311,697 A | | 5/1994 | Cavanaugh et al. | |
| 5,339,550 A | | 8/1994 | Hoffman | |
| 5,549,940 A | * | 8/1996 | Noone | 206/579 |

FOREIGN PATENT DOCUMENTS

| | | | |
|---|---|---|---|
| EP | 0284764 | | 10/1988 |
| EP | 0535417 | | 4/1993 |
| EP | 0674297 | | 9/1995 |
| GB | 1006793 | | 10/1965 |
| GB | 2230638 A | * | 10/1989 |
| GB | 2230638 | | 10/1990 |
| WO | 9827533 | | 6/1998 |
| WO | wo 9827533 | * | 6/1998 |

* cited by examiner

*Primary Examiner*—Michael G. Lee
*Assistant Examiner*—Daniel Walsh
(74) *Attorney, Agent, or Firm*—Michael Chan; Francis L. Conte

(57) ABSTRACT

An automatic teller machine (ATM) (10) has a media entry slot (14*a* or 18*a* or 22*a* or 24*a*) through which media, such as a customer identifying card (28), currency, a receipt, or an envelope can be either received from an ATM customer or dispensed to the ATM customer. A light panel (56) is adjacent the media entry slot and carries a decal (56) overriding an energizeable electroluminescent light panel (62). The decal includes (i) a semi-translucent background portion (57) which is illuminated when the light panel is illuminated, and (ii) a clear textual and/or graphical information portion (58, 59) which is illuminated with greater brightness than the background portion when the light panel is illuminated.

26 Claims, 3 Drawing Sheets

FIG. 1
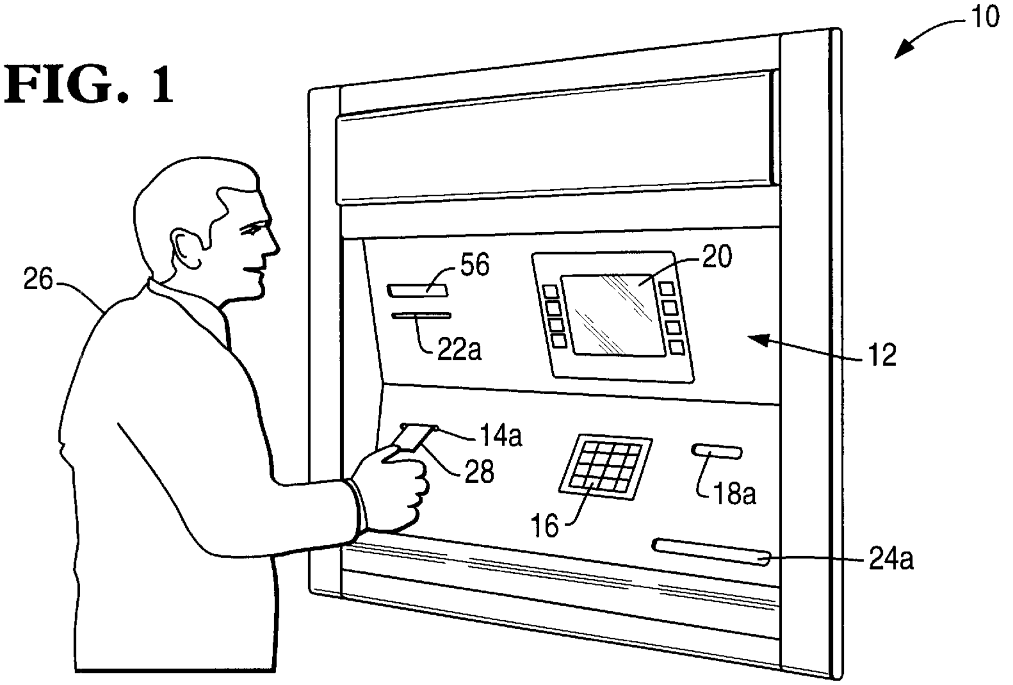
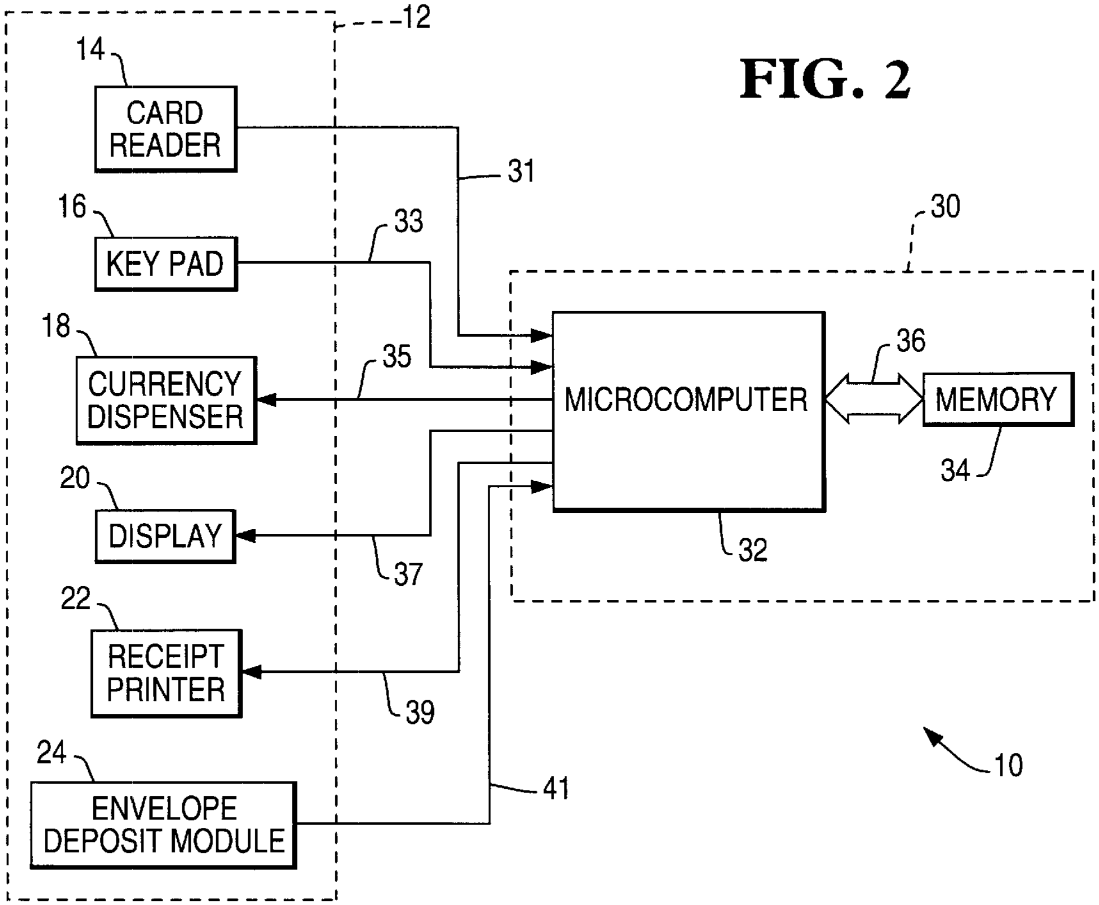
FIG. 2

USER INTERFACE FOR A SELF-SERVICE TERMINAL

BACKGROUND OF THE INVENTION

The present invention relates to a user interface for a self-service terminal (SST), and is particularly directed to a user interface for a self-service terminal such as an automated teller machine (ATM).

A typical user interface for an ATM includes a number of different types of media entry slots through which different media may be received and/or dispensed. Such media entry slots include a card entry slot through which an ATM customer may insert a customer identifying card, a cash dispense slot through which currency can be delivered, a receipt dispense slot through which a receipt can be delivered, and an envelope deposit slot through which an envelope containing a valuable document may be deposited.

In known user interfaces the location of each type of media entry slot is usually indicated with either a printed decal or an illuminated light panel. Both a decal and an indicator may be used to indicate the location of a particular media entry slot on the user interface. However, a disadvantage results when both a decal and an indicator are used, because additional panel space on the user interface is needed to accommodate both the decal and the indicator.

SUMMARY OF THE INVENTION

According to the invention a user interface for a self-service terminal comprises a media entry slot through which media can be either received or dispensed, characterized by;

an illuminable light panel adjacent the media entry slot, and a decal overlying the light panel and having areas of relatively high optical transmission and areas of relatively low optical transmission so as to provide textual and/or graphical information relating to the media entry slot.

Preferably, the light panel comprises an electroluminescent light panel. The decal includes (i) a semi-translucent background portion which illuminates when the light panel is illuminated, and (ii) a clear textual and/or graphical information portion which illuminates with more brightness than the background portion when the light panel is illuminated. The media entry slot may be a card entry slot of a card reader, a currency dispense slot of a currency dispenser, a receipt dispense slot of a receipt printer, or an envelope deposit slot of an envelope deposit module, for example.

Also according to the invention a self service terminal may comprise a processor; data input means; and display means; characterized by a user interface according to any one of claims 1 to 4.

BRIEF DESCRIPTION OF THE DRAWINGS

The invention will now be described with reference to the accompanying drawings, wherein:

FIG. 1 is a perspective view of an automated teller machine (ATM) embodying a user interface in accordance with the present invention;

FIG. 2 is a block representation of the ATM of FIG. 1;

DETAILED DESCRIPTION

Figure 3:
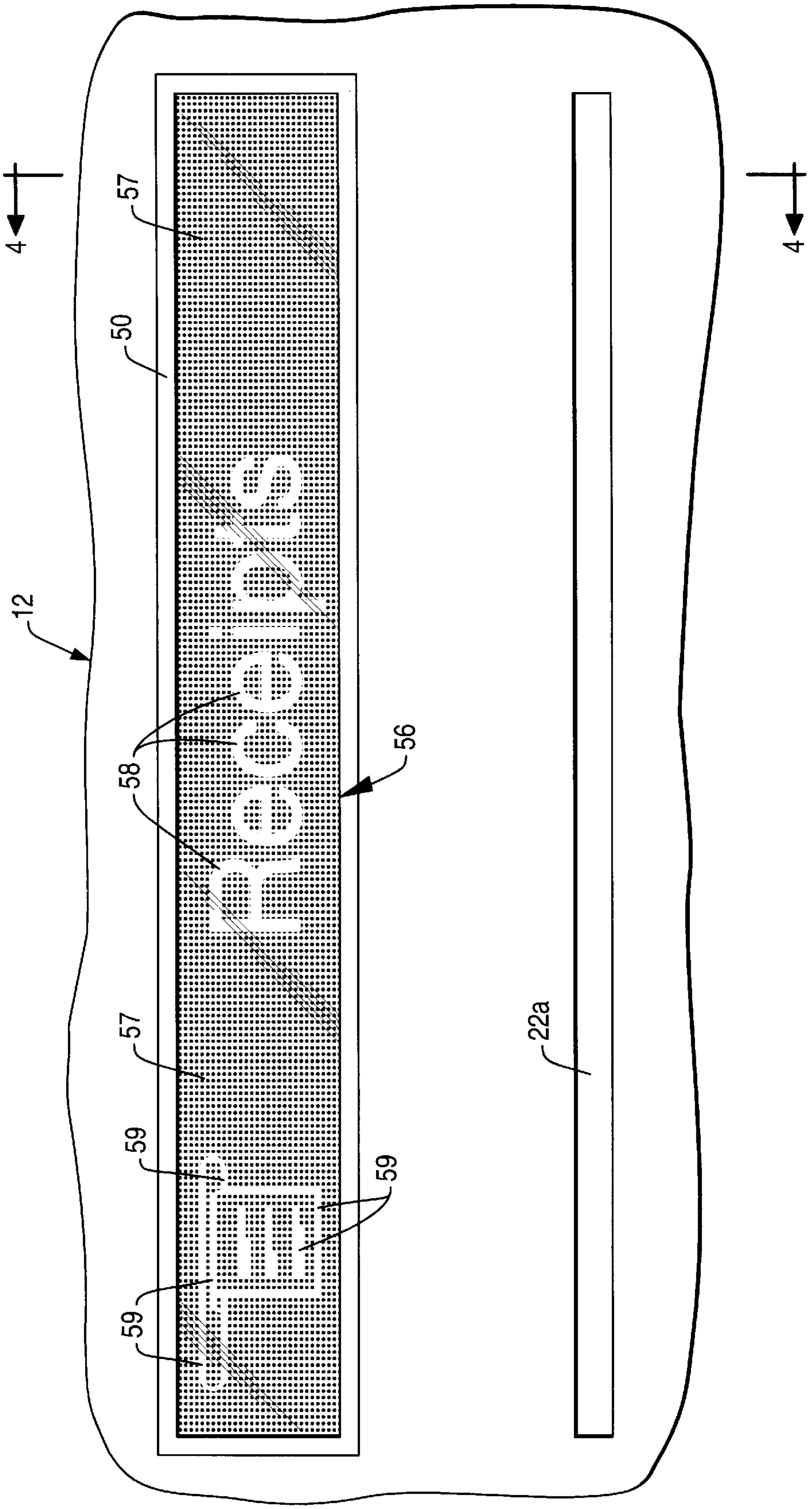
FIG. 3 is an enlarged portion of the user interface of the ATM of FIG. 1.

In FIGS. 1 and 2, an ATM 10 comprises a user interface in the form of a front panel 12. The front panel 12 includes a card reader 14, a key pad 16, a currency dispenser 18, a CRT display 20, a receipt printer 22, and an envelope deposit module 24. As particularly shown in FIG. 1, the card reader 14 has a card entry slot 14*a* through which a customer 26 can insert a customer identification card 28 at the commencement of a financial transaction. The currency dispenser 18 has a currency dispense slot la through which cash currency notes stored inside the ATM 10 can be delivered to the customer 26. The receipt printer 22 has a receipt slot 22*a* through which a receipt of the financial transaction is delivered to the customer 26 at termination of the financial transaction. The envelope deposit module 24 has an envelope deposit slot 24*a* through which the customer 26 may insert an envelope which contains a valuable document to be deposited. The customer 26 has access to the card entry slot 14*a,* the currency dispense slot 18*a,* the receipt slot 22*a,* and the envelope deposit slot 24*a* via the front panel 12.

When the customer 26 inserts the customer identification card 28 into the card entry slot 14*a,* the card reader 14 reads data on the card. The customer 26 is then prompted on the CRT display 20 to enter a personal identification number (PIN) via the key pad 16. After the correct PIN is entered, menus are displayed on the display 20 to enable the customer 26 to carry out the desired financial transaction. After the financial transaction is completed, the receipt printer 22 prints a receipt of the financial transaction and delivers the receipt through the receipt slot 22*a* of the receipt printer 22 to the customer 26.

Referring particularly to FIG. 2, the ATM 10 further comprises a controller unit 30 which communicates with components of the front panel 12. The controller unit 30 includes a microcomputer 32 and a memory 34 connected via bus line 36 to the microcomputer 32. The microcomputer 32 receives input signals on lines 31, 33, 41 from the card reader 14, the key pad 16, and the envelope deposit module 24, respectively, and provides control signals on lines 35, 37, 39 to the currency dispenser 18, the display 20, and the receipt printer 22, respectively. The memory 34 may be non-volatile RAM.

Figure 4:
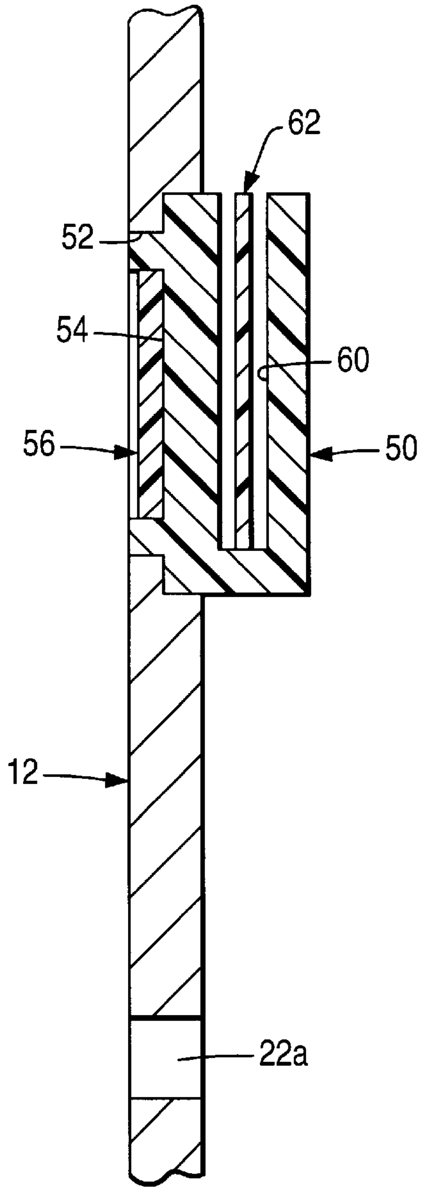
FIG. 4 is a sectional view, taken approximately along lines 4—4 of FIG. 3, of a light panel assembly of the user interface.

Referring to FIG. 3, an enlargement of a portion of the front panel 12 is illustrated. A cross sectional view taken approximately along line 4—4 of FIG. 3 is illustrated in FIG. 4. The enlarged portion of FIG. 3 is in the vicinity of the receipt slot 22*a* on the front panel 12. As shown in FIGS. 3 and 4, a clear plastic molding 50 is attached to the front panel 12 in a rectangular opening 52 of the front panel 12 using a suitable adhesive. The clear plastic molding 50 has a shape as best shown in FIG. 4. The rectangular opening 52 is located just above the receipt slot 22*a.*

The molding 50 has recess 54, as shown in FIG. 4, into which a decal 56 is disposed. The decal 56 is attached to the molding 50 using a suitable adhesive or the like. The decal 56 has a semi-translucent background portion 57, a clear textual portion 58, and a clear graphical portion 59, as shown in FIG. 3.

The molding 50 also has a U-shaped slot 60 into which an energizeable light panel 62 is disposed. The light panel 62 is supported in the U-shaped slot 60 of the molding 50. Preferably, the light panel 62 comprises an energizeable electroluminescent light strip which is manufactured by Concept Data Display Ltd. located in Leeds, England. These light panels are sold under the name of Flexi-brite and provide a flexible cold lighting system. A somewhat schematic view of such an electroluminescent light strip is shown in FIG. 5.

Figure 5:
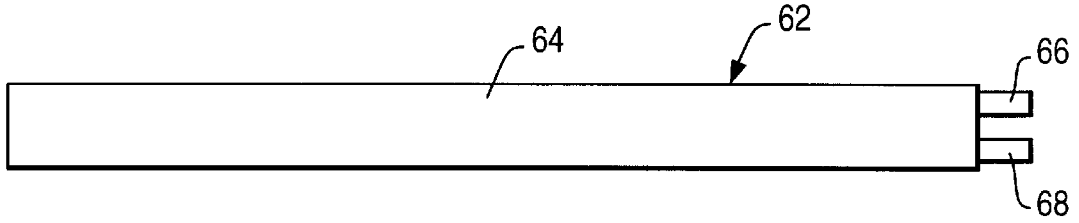
FIG. 5 is a somewhat schematic view of an energizeable electroluminescent light strip or light pad which is used in the light panel assembly of FIG. 4.

The light panel 62 shown in FIG. 5 includes a panel portion 64 and a pair of electrical terminals 66, 68 connected to one end of the panel portion 64. When a suitable voltage, such as from batteries or a main power supply (not shown) is applied to the electrical terminals 66, 68, the panel portion 64 illuminates. Brightness of the panel portion 64 is relatively uniform across the entire area of the panel portion 64.

When the panel portion 64 of the light panel 62 illuminates, light passes from the panel portion 64 through the clear plastic molding 50 and illuminates the decal 56. When the decal 56 is illuminated, more light passes through the clear textual portion 58 and the clear graphical portion 59 than the semi-translucent background portion 57 of the decal, so that the customer 26 can read the textual and graphical portions 58, 59 of the decal 56, and easily locate the adjacent slot.

One advantage of the illustrated arrangement is that the decal 56 overlies the light panel 62, and the decal and light panel cooperate together as an integrated unit. This results in more panel space on the front panel 12 being available to accommodate other features and functions of the ATM 10.

To assist use even further, the light panel can be illuminated intermittently, so that the textual and graphical portions flash at intervals, and attract the user's attention.

Although the assembly of the decal 56 and the light panel 62 described hereinabove is located above the receipt slot 22*a*, the assembly could be located either below or at the side of the receipt slot 22*a*. Also, a similar decal and light panel arrangement could be directed to any other card entry slot of the ATM 10, with the textual and graphical portions appropriate to that slot.

What is claimed is:

1. A user interface for a self-service terminal, the user interface comprising:

a front panel;

means defining a media entry slot in said front panel through which media can be either received or dispensed;

a molding affixed to said front panel in a complementary opening therethrough, and including a front recess and a rear slot separated by said clear wall;

an illuminable light panel disposed in said rear slot adjacent the media entry slot; and a decal disposed in said front recess and having areas of relatively high optical transmission and areas of relatively low optical transmission so as to provide textual and/or graphical information relating to the media entry slot.

2. A user interface according to claim 1, wherein the decal includes a semi-translucent background portion which is illuminated when the light panel is illuminated, and a clear textual and/or graphical information portion which is illuminated with greater brightness than the background portion when the light panel is illuminated.

3. A user interface according to claim 1, wherein the illuminable light panel comprises an energizeable electroluminescent light panel.

4. A user interface according to claim 3, wherein the light panel is energizeable intermittently.

5. A user interface for a self-service terminal, the user interface comprising:

a front panel;

means defining a media entry slot in said front panel through which media can be either received or dispensed;

a molding affixed to said front panel in a complementary opening therethrough, and including a front recess and a rear slot separated by a clear wall;

a light panel disposed in said rear slot adjacent the media entry slot and for, when connected to an electrical power source, illuminating to indicate location of the media entry slot; and a decal disposed in said front recess such that the decal is illuminated to convey textual and/or graphical information relating to the media entry slot when the light panel is illuminated.

6. A user interface according to claim 5, wherein the light panel comprises an energizeable electroluminescent light panel.

7. A user interface according to claim 5, wherein the decal includes (i) a semi-translucent background portion which illuminates when the light panel is illuminated, and (ii) a clear textual and/or graphical information portion which illuminates with more brightness than the background portion when the light panel is illuminated.

8. A user interface according to claim 5, wherein the media entry slot is a card entry slot of a card reader.

9. A user interface according to claim 5, wherein the media entry slot is a currency dispense slot of a currency dispenser.

10. A user interface according to claim 5, wherein the media entry slot is a receipt dispense slot of a receipt printer.

11. A user interface according to claim 5, wherein the media entry slot is an envelope deposit slot of an envelope deposit module.

12. An automatic teller machine (ATM) for allowing an ATM customer to carry out a self-service financial transaction, the ATM comprising:

a front panel;

a card reader for (i) receiving a customer identification card from an ATM customer desiring to carry out a self-service financial transaction, and (ii) reading data from the customer identification card to verify identity of the ATM customer before allowing the ATM customer to carry out the desired self-service financial transaction;

a molding affixed to said front panel in a complementary opening therethrough, and including a front recess and a rear slot separated by a clear wall;

means defining a card entry slot in said front panel through. which an ATM customer desiring to carry out a self-service financial transaction may insert a customer identifying card to enable identity of the ATM customer to be verified before allowing the ATM customer to gain access to services provided by the ATM;

a light panel disposed in said rear slot adjacent the card entry slot and for, when connected to an electrical power source, illuminating to indicate location of the card entry slot to an ATM customer; and a decal disposed in said front recess such that the decal is illuminated to convey textual and/or graphical information relating to the card entry slot to an ATM customer when the light panel is illuminated.

13. An ATM according to claim 12, wherein the light panel comprises an energizeable electroluminescent light panel.

14. An ATM according to claim 12, wherein the decal includes (i) a semi-translucent background portion which illuminates when the light panel is illuminated, and (ii) a clear textual and/or graphical information portion which illuminates with more brightness than the background portion when the light panel is illuminated.

15. An automatic teller machine (ATM) for allowing an ATM customer to carry out a self-service financial transaction, the ATM comprising:

a front panel;

a currency dispenser for storing currency to be dispensed to an ATM customer;

a molding affixed to said front panel in a complementary opening therethrough, and including a front recess and a rear slot separated by a clear wall;

means defining a currency dispense slot in said front panel through which currency can be dispensed from the currency dispenser to an ATM customer;

a light panel disposed in said rear slot adjacent the currency dispense slot and for, when connected to an electrical power source, illuminating to indicate location of the currency dispense slot to an ATM customer; and a decal disposed in said front recess such that the decal is illuminated to convey textual and/or graphical information relating to the currency dispense slot to an ATM customer when the light panel is illuminated.

16. An ATM according to claim 15, wherein the light panel comprises an energizeable electroluminescent light panel.

17. An ATM according to claim 15, wherein the decal includes (i) a semi-translucent background portion which illuminates when the light panel is illuminated, and (ii) a clear textual and/or graphical information portion which illuminates with more brightness than the background portion when the light panel is illuminated.

18. An automatic teller machine (ATM) for allowing an ATM customer to carry out a self-service financial transaction, the ATM comprising:

a front panel;

a receipt printer for printing a receipt associated with the self-service financial transaction;

a molding affixed to said front panel in a complementary opening therethrough, and including a front recess and a rear slot separated by a clear wall;

means defining a receipt slot in said front panel through which a receipt can be dispensed from the receipt printer to an ATM customer;

a light panel disposed in said rear slot adjacent the receipt slot and for, when connected tp an electrical power source, illuminating to indicate location of the receipt slot to an ATM customer; and a decal disposed in said front recess such that the decal is illuminated to convey textual and/or graphical information relating to the receipt slot to an ATM customer when the light panel is illuminated.

19. An ATM according to claim 18, wherein the light panel comprises an energizeable electroluminescent light panel.

20. An ATM according to claim 18, wherein the decal includes (i) a semi-translucent background portion which illuminates when the light panel is illuminated, and (ii) a clear textual and/or graphical information portion which illuminates with more brightness than the background portion when the light panel is illuminated.

21. An automated teller machine (ATM) comprising:

a front panel including an access slot and an associated opening adjacent thereto;

a module disposed behind said access slot for receiving or dispensing media therethrough;

a molding affixed to said front panel in a complementary opening therethrough, and including a front recess and a rear slot separated by a clear wall;

a printed decal fixedly disposed in said front recess;

a light panel disposed in said rear slot; and means for energizing said light panel to back illuminate said printed decal through said clear wall of said molding.

22. An ATM according to claim 21 wherein said molding is mounted in said front panel to position said recess and decal below a front surface thereof.

23. An ATM according to claim 22 wherein said rear slot of said molding is positioned behind said front panel, and opens upwardly for receiving downwardly said light panel therein.

24. An ATM according to claim 23 wherein said light panel comprises a flat electroluminescent strip having relatively uniform illumination brightness thereacross.

25. An ATM according to claim 23 wherein said decal comprises a semi-transparent background portion and a clear textural portion therein.

26. An ATM according to claim 23 wherein said module is selected from the group consisting of a card reader, a currency dispenser, a receipt printer, and an envelope deposit module.

* * * * *